United States Patent
Maimon

(10) Patent No.: US 9,633,228 B1
(45) Date of Patent: Apr. 25, 2017

(54) VERIFIABLE MEDIA SYSTEM AND METHOD

(71) Applicant: Haim Maimon, Zoran (IL)

(72) Inventor: Haim Maimon, Zoran (IL)

( * ) Notice: Subject to any disclaimer, the term of this patent is extended or adjusted under 35 U.S.C. 154(b) by 146 days.

(21) Appl. No.: 14/718,117

(22) Filed: May 21, 2015

Related U.S. Application Data

(60) Provisional application No. 62/001,423, filed on May 21, 2014.

(51) Int. Cl.
  *H04L 29/06* (2006.01)
  *G06F 21/64* (2013.01)
  *G06F 21/60* (2013.01)
  *H04L 9/32* (2006.01)
  *G06F 11/30* (2006.01)
  *G06F 12/14* (2006.01)
  *G06K 9/00* (2006.01)

(52) U.S. Cl.
  CPC .......... *G06F 21/645* (2013.01); *G06F 21/602* (2013.01); *H04L 63/12* (2013.01)

(58) Field of Classification Search
  None
  See application file for complete search history.

(56) References Cited

U.S. PATENT DOCUMENTS

| | | | | |
|---|---|---|---|---|
| 7,738,659 B2* | 6/2010 | Moskowitz | ............ | G06T 1/0028 380/203 |
| 8,121,342 B2* | 2/2012 | Davis | ............ | G06F 21/10 382/100 |
| 8,261,068 B1* | 9/2012 | Raizen | ............ | G06F 21/6218 713/164 |
| 8,447,989 B2* | 5/2013 | Barrus | ............ | G06F 21/64 713/181 |
| 8,977,860 B2 | 3/2015 | Barrus | | |
| 9,450,764 B1* | 9/2016 | Savant | ............ | H04L 9/3268 |
| 2003/0219143 A1* | 11/2003 | Moskowitz | ............ | G06T 1/0028 382/100 |
| 2004/0167858 A1* | 8/2004 | Erickson | ............ | G06F 21/10 705/55 |
| 2005/0108556 A1* | 5/2005 | DeMello | ............ | G06F 21/10 713/189 |
| 2006/0257001 A1* | 11/2006 | Van Der Veen | . | G11B 20/00086 382/100 |
| 2008/0263610 A1* | 10/2008 | Murray | ............ | G06F 17/30017 725/110 |
| 2009/0144382 A1* | 6/2009 | Benninghoff, III | ... | H04L 9/3236 709/206 |
| 2009/0282432 A1* | 11/2009 | Hahnefeld | ......... | G06Q 30/0601 725/31 |
| 2012/0269412 A1* | 10/2012 | Guan | ............ | G06T 1/0028 382/128 |
| 2013/0007794 A1* | 1/2013 | Besehanic | ............ | H04L 65/607 725/20 |

(Continued)

FOREIGN PATENT DOCUMENTS

| | | |
|---|---|---|
| CN | 102103738 | 6/2011 |
| WO | 2004003841 | 1/2004 |

*Primary Examiner* — Shin-Hon Chen
(74) *Attorney, Agent, or Firm* — Graeser Associates International Inc; Dvorah Graeser

(57) ABSTRACT

A system and method for creating and retrieving verifiable media and in particular, such a system and method in which the circumstances related to the media are encapsulated along with the media to guarantee its authenticity.

22 Claims, 9 Drawing Sheets

(56) References Cited

U.S. PATENT DOCUMENTS

| | | | |
|---|---|---|---|
| 2013/0236123 A1* | 9/2013 | Alasia | H04N 1/448 382/294 |
| 2015/0016661 A1* | 1/2015 | Lord | H04N 21/42203 382/100 |
| 2015/0319490 A1* | 11/2015 | Besehanic | H04N 21/44213 725/19 |

\* cited by examiner

VERIFIABLE MEDIA SYSTEM AND METHOD

FIELD OF THE INVENTION

The present invention is of a system and method for creating and retrieving verifiable media and in particular, such a system and method in which the circumstances related to the media are encapsulated along with the media to guarantee its authenticity.

BACKGROUND OF THE INVENTION

Portable devices with integrated cameras have become commonplace and users of these devices can easily record any event using media such as photos, videos, or audio recordings. In some cases this recorded media may be needed for non-recreational purposes such as legal proceedings. For example, photos taken at the site of a car accident may be used to determine compensation for damage caused, and the time, date and location of the photos must reflect the circumstances of the accident. A further example includes the use of media used by journalists where there is a desire to ensure the authenticity of the captured photos or videos to enhance the reputation of the news provider.

However, there are multiple software applications available that allow modification of the actual media or of the media metadata and the authenticity of recorded media is thus brought into question.

It would therefore be desirable to have a means to verify the authenticity of this media i.e.: that the media shown is the original unedited media and that it was captured at the place, and at the time claimed by the user.

Various attempts have been made to overcome this problem. For example, U.S. Pat. No. 8,447,989 teaches a method and apparatus for maintaining a tamper proof device log. The method comprises maintaining an embedded log in the device, the embedded log being a chain of log entries. In one embodiment, the method may also comprise publishing at least one log entry to a location external to the device.

However, this approach leaves the source images in their native form and allows their manipulation independent of the log. Further, the method is cumbersome as it requires correlation of camera logs with pictures taken.

SUMMARY OF THE INVENTION

There is thus an unmet need for, and it would be highly useful to have, a system and method that enables verification of the authenticity of generated media.

The present invention overcomes the deficiencies of the background art by providing a system and method for creating and retrieving verifiable media where the media and associated metadata identifying the circumstances of the media creation are stored together in a package, such as an encrypted package, that is blocked from editing or tampering, yet which still permits the media to be accessed. For example, for an image, the encrypted package may optionally be viewable through software which permits the image to be viewed, optionally with some type of watermark or other visual indication to demonstrate at least one feature of the image. For example the watermark may optionally be used to show the date on which the image was taken. The software for packaging the media into the secure package is operated by the device which captures the media.

According to some embodiments of the present invention, the system and method provide for the packaging of software in the form of an app running on a device such as a smartphone. The terms app, application, software, verifiable media app or verifiable media software are used interchangeably herein. The app is preferably in direct communication with the component(s) of the smartphone which capture the media to directly obtain the media data. The app then adds metadata from the device and its sensors. For example, if the device includes a GPS receiver, then the geographic coordinates of the device, at the time the media was captured, may be added as metadata. Further examples include; the device type, orientation, cellular or WiFi networks detected and the time and date. The media and metadata are combined in the secure package, such as an encrypted package, and securely transmitted to a central server, which may optionally for example be managed by an entity providing verifiable media services.

The server optionally adds further metadata to the received package before storing the verifiable media package in a local secure database, preferably adding further encryption before storage. The verifiable media package therefore preferably comprises one or more media files, metadata and encryption data, which may optionally be combined to a single file. The terms verifiable media and verifiable media package are used interchangeably.

The app (whether the same app or a different app, such as a dedicated reader software or a web browser with a reader plugin for example) can then retrieve the read-only verifiable media from the server for viewing. The terms viewing or accessing are used herein interchangeably to refer to display of the verifiable media, including the media itself and associated metadata, on the display of the viewing device and optionally, if the media includes an audio component, playing this audio via the audio output of the accessing device.

Alternatively, the app may provide a dedicated link to the verifiable media for viewing by a $3^{rd}$ party, for example by using another instance of the app, a web browser with a plugin or specialized viewing software. Alternatively the verifiable media may be viewed using an Internet browser without any plugin or specialized software. In such a case, the media and information are presented on the site in a format that cannot be edited or manipulated without damaging the media, for example by overlaying a watermark on top of the media and associated metadata. Further, the verifiable media creator or a $3^{rd}$ party may order a printout of the verifiable media that is delivered as a certificate containing images of the media, the metadata and a watermark or other guarantee of authenticity.

Optionally, provision is made for shifting the position of the watermark in case it is obscuring an important part of the media or metadata. Optionally, the verifiable media software is provided as an SDK for integration into other applications requiring a verifiable media component. All embodiments below should be considered to be functional within the SDK delivery model.

The combined extensive metadata and the tamper-proof delivery mechanism enable verification that the media was created at the time and place attested to, and that it is the same unedited media.

According to some embodiments of the preset invention a method for generating a verifiable media package comprises: providing a computational device for generating media; providing software for operation by the device; generating media using the device and the software; generating metadata according to at least one parameter obtained from at least one of the device, the software, the media or a combination thereof; combining the media, and the metadata into an encrypted package; transmitting the encrypted package to a central server; generating further metadata according to at least one parameter obtained from at least one of the server or an external resource or a combination thereof; and combining the further metadata and the encrypted package into a further encrypted package thereby creating the verifiable media package. Optionally, the transmitting of the encrypted package takes place over an encrypted network connection between the software and the server.

Preferably, the method further comprises requesting to view the verifiable media package by the software from the server; transmitting the media package to the software by the server; and viewing the package with the software. Alternatively, the method further comprises providing a computational device operating a web browser; providing a software plugin to the browser that allows the browser to view a verifiable media package; requesting to view the verifiable media package by the web browser operating the plugin from the server; transmitting the media package to the web browser by the server; and viewing the package with the browser operating the plugin.

Alternatively, the method further comprises providing a computational device operating verifiable media viewing software capable of viewing a verifiable media package; requesting to view the verifiable media package by the viewing software from the server; transmitting the media package to the viewing software by the server; and viewing the package with the viewing software.

Preferably the method further comprises requesting a printed document describing the verifiable media by the software or a web browser or verifiable media viewing software from the server; and printing the document by the server wherein the document comprises a visualization of the generated media, the metadata, and the further metadata. Preferably, the document further comprises at least one of a hologram, a watermark or both.

According to further embodiments of the preset invention a system for generating a verifiable media package comprises a computational device for generating media; software for operation on the device; and a central server for storing the package; wherein the media is generated by the device and the software, the media is combined with metadata and then encrypted to form an encrypted package by the software, the encrypted package is transferred to the server by the software, generating further metadata by the server, combining the further metadata and the encrypted package into a further encrypted package thereby creating the verifiable media package, wherein the metadata is generated according to at least one parameter obtained from the device, the software, the media or a combination thereof and the further metadata is generated according to at least one parameter obtained from at least one of the server or an external resource or a combination thereof.

Preferably, the system further comprises a retrieval server operative to transmit the verifiable media package to the software upon request from the software for viewing by the software. Optionally, the system further comprises a computational device operating a Web browser with an integrated browser plugin operative to request the verifiable media package from the retrieval server and to allow viewing of the verifiable media package when the retrieval server transmits the verifiable media package to the browser. Optionally, the system further comprises a computational device operating verifiable media viewing software operative to request the verifiable media package from the retrieval server and to allow viewing of the verifiable media package when the retrieval server transmits the verifiable media package to the viewing software.

According to further embodiments of the preset invention a method for generating a verifiable media package comprises providing a computational device for generating media; providing software for operation by the device; generating media using the device and the software; generating metadata according to at least one parameter obtained from at least one of the device, the software, the media or a combination thereof; and combining the media, and the metadata and encrypting these to form a verifiable media package. Preferably, the method further comprises viewing the verifiable media package by the software on the device. Preferably, the method further comprises transmitting the encrypted package for storage at a central server. Preferably, the method further comprises requesting to view the verifiable media package by the software from the server; transmitting the media package to the software by the server; and viewing the package with the software.

Preferably, the method further comprises providing a computational device operating a web browser; requesting to view the verifiable media package by the web browser from the server; providing the media package to the web browser by the server; and viewing the package with the browser. Optionally, the method further comprises providing a computational device operating a web browser; providing a software plugin to the browser that allows the browser to view a verifiable media package; requesting to view the verifiable media package by the web browser operating the plugin from the server; transmitting the media package to the web browser by the server; and viewing the package with the browser operating the plugin. Optionally, the method further comprises providing a computational device operating verifiable media viewing software capable of viewing a verifiable media package; requesting to view the verifiable media package by the viewing software from the server; transmitting the media package to the viewing software by the server; and viewing the package with the viewing software.

Preferably, the device comprises at least one of a still image camera, video camera, and microphone and wherein the generated media comprises at least one of a photo captured by the still image camera, a video captured by the video camera and the microphone, an audio recording captured by the microphone, or any combination of these. Optionally the still image camera and the video camera are contained within a single camera device. Preferably the device comprises at least one of a touch screen, a keyboard, a virtual keyboard, a mouse, and a pen and tablet and wherein the generated media comprises at least one of text or graphics created using at least one of the touch screen, the keyboard, the virtual keyboard, the mouse, the pen and tablet or any combination of these.

Preferably the device comprises at least one component selected from the group consisting of a WiFi interface, cellphone radio, compass, gyroscope, GPS receiver, accelerometer, and magnetometer, and wherein the metadata is generated according to at least one parameter obtained from the at least one component. Preferably, the metadata comprises at least one of: the name and signal strength of a WiFi network detected by the WiFi interface; cellphone operator ID, mobile data type and signal strength detected by the cellphone radio; direction, heading and orientation of the device indicated by the compass, the accelerometer or the magnetometer; geographic coordinates of the device, and height above sea level of the device provided by the GPS receiver or any combination of these. Preferably, the metadata comprises the time and date of the generation of the media as provided by one of the device or the GPS receiver or both of these. Preferably, the metadata comprises at least one of the device manufacturer, model type, MAC address, phone number, operating system and version, IMEI number, serial number or a combination of these obtained from the device.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computational device", a "computer", or "device", or "mobile device" on a "computer network" or simply "network", it should be noted that optionally any device featuring a data processor and the ability to execute one or more instructions may be described as a computer or on of the alternative terms used above, including but not limited to any type of personal computer (PC), a server, a cellular telephone, an IP telephone, a smartphone, a PDA (personal digital assistant), or a pager. Any two or more of such devices in communication with each other may optionally comprise a "network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1A:
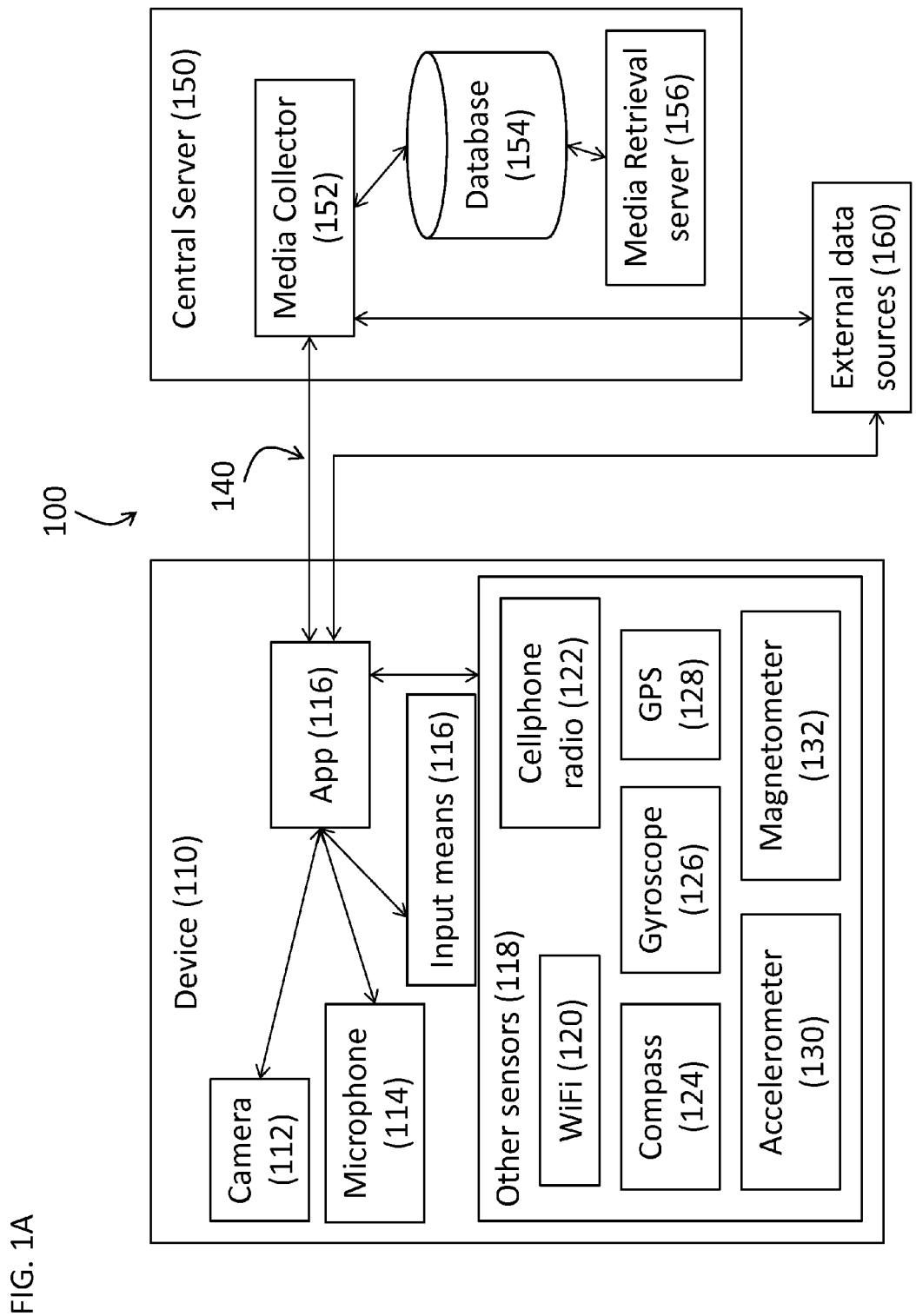
FIG. 1A shows an exemplary, illustrative non-limiting system for creating verifiable media, according to some embodiments of the present invention.

The present invention is of a system and method for creating and optionally retrieving verifiable media. The system and method rely on the use of dedicated verifiable media software also referred to as an application or app which provides; an interface for creating media, adds metadata to assist in verifying media, and provides an interface for retrieving verifiable media. The verifiable media package comprises one or more media files, metadata and encryption data, which may optionally be combined to a single file. The app runs on a device comprising components that allow creation of media data. These components preferably include a still images camera, video camera and microphone. Optionally a single camera on the device is used to capture both still images and videos. The device is a computational device as described above comprising a processor, memory and other hardware necessary for software operation. Non-limiting examples of such devices include smartphones, such as those based on Google's Android operating system or those based on Apple's iOS.

In operation the app generates media from these components. This generated media is preferably one or more of the following non-limiting examples; a photograph captured by the device camera, a video captured from the device camera optionally including audio from the microphone, or an audio file captured by the microphone. The app then preferably saves the created media along with metadata generated from at least one parameter obtained from the device, the app, the media or a combination of these, preferably in a unique encrypted file format. For example, the device might include a GPS receiver that could provide the geographic coordinates of the device. The parameter in this exemplary case would be the geographic coordinates and the generated metadata would be the geographic position of the device at the time the media was generated. Other non-limiting examples of such metadata obtained from other sensors or components includes; the base station or other cellular data from the cellphone radio, the device type and serial number from the device CPU and memory, and the device heading from the compass.

This encrypted file containing media and metadata is then transferred to a central server, where further metadata is preferably appended such as time and date from a reputable Internet time server, weather information from online resources and a unique identifying code. This verifiable media stored in a database that is part of the central server. Optionally, the central server does not add any further data aside from the received time and date and simply stores the encrypted file received from the device.

Optionally the verifiable media is then retrieved from the server according to a request. The request may optionally be made by the user who generated the verifiable media on the verifiable media app that generated the media, a verifiable media app on a different device, verifiable media viewer software, a web browser with a verifiable media viewer plugin, or a web browser without any specialized plugin, where web access requires a user login. Optionally, a unique link to the verifiable media may be sent from one of these sources to a $3^{rd}$ party who could then retrieve the verifiable media using the verifiable media app, viewer software, a web browser with a verifiable media viewer plugin, or a web browser without any specialized plugin.

Optionally such retrieval is supported by a retrieval service, which preferably retrieves the verifiable media from the server database upon request and transmits it to the requesting software. The request and transmission are made over a computer network which may be any computer network as described above. Optionally the communication over the network is encrypted.

The unique file format incorporating the media and added metadata is preferably only accessible using the verifiable media app, web browser with viewer plugin, or verifiable media viewing software that only allows viewing but not generation of verifiable media. This may be likened to the PDF file format known in the art which allows saving of documents in a protected format that allows viewing but not editing using a dedicated PDF reader. Once retrieved, the verifiable media is preferably presented on the screen of the requesting device along with the metadata that was added by the app and by the server. Optionally, the verifiable media may be viewed using a web browser or image viewer with no specialized functionality or plugins, but the verifiable media preferably is presented with a watermark or other non-removable, non-editable indication of authenticity.

In the exemplary case of a verifiable image, the accessing software would preferably display the image along with text describing the metadata and optionally other visualizations of the metadata such as a map displaying the location of the verifiable media generation. In the exemplary case of verifiable video or audio the software would preferably display the video or audio in an appropriate video player along with the metadata. Optionally, the metadata or some part thereof would be displayed on top of the displayed media to prevent copying and modification.

If the retrieving software is a web browser with a verifiable media viewer plugin, then the retrieving server would serve the verifiable media within an HTML page. The plugin would render the verifiable media in the same form as would the verifiable media viewer software described above.

Alternatively, a request may be made from the software described above to provide the verifiable media as a printed certificate. The printed certificate preferably includes the media or a verifiable visualization thereof along with the metadata.

In the exemplary case of a verifiable image, the certificate would preferably display the image along with text describing the metadata and optionally other visualizations of the metadata such as a map displaying the location of the verifiable media generation. In the exemplary case of verifiable video the certificate would preferably display a series of frames from the video along with the metadata. In the exemplary case of verifiable audio the certificate would preferably display the audio signal amplitude vs. time in a graphical format along with the metadata. Optionally, the metadata or some part thereof would be printed on top of the media to prevent copying or modification. Optionally the certificate would include a watermark or some other anti-forgery mechanism.

The inability to tamper with the media and its associated attached metadata enables the verification of the authenticity of the media as the original unedited media having been created at the time, date and place recorded.

Figure 1B:
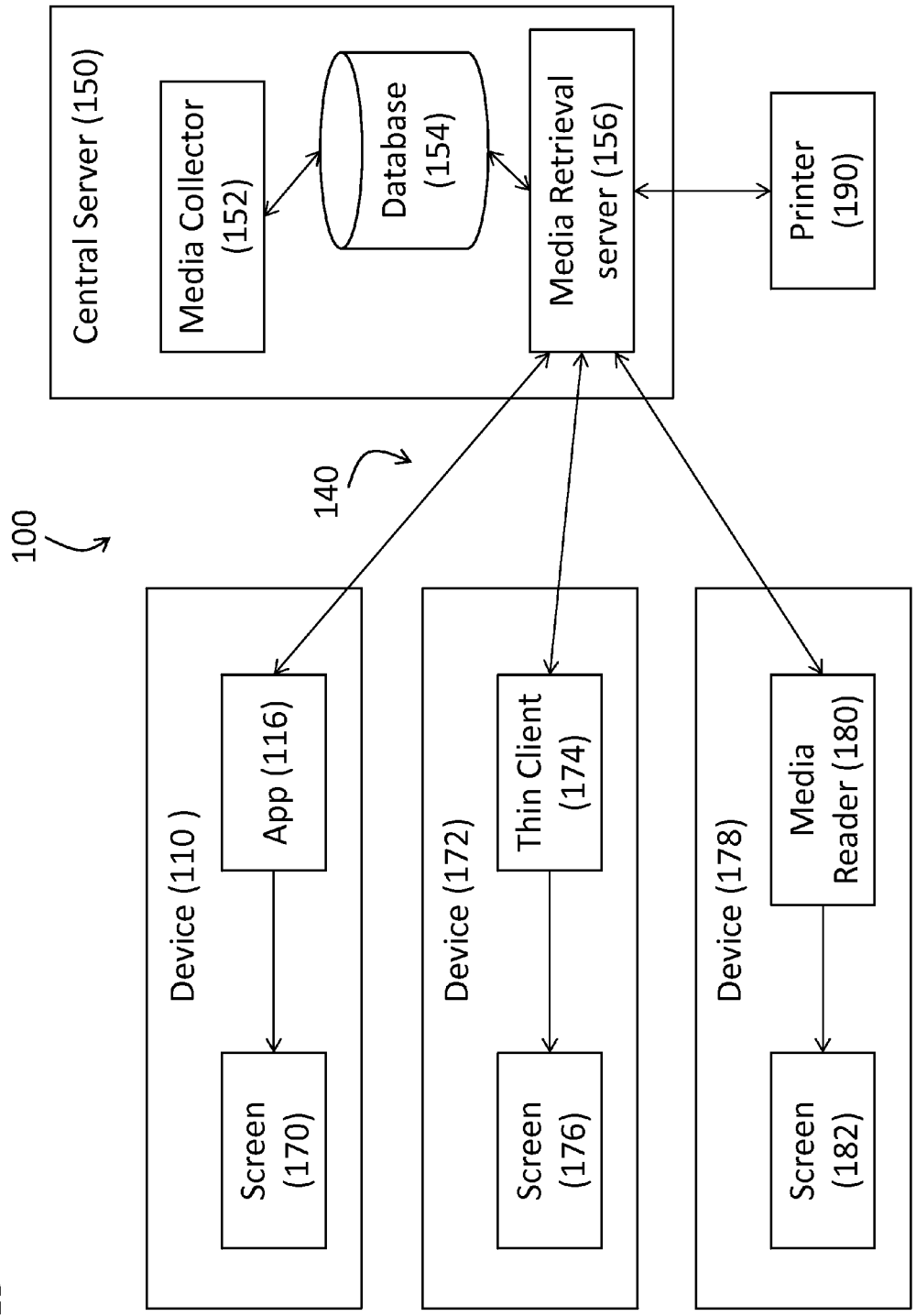
FIG. 1B shows an exemplary, illustrative non-limiting system for retrieving verifiable media, according to some embodiments of the present invention.

Referring now to the drawings, FIGS. 1A and 1B show an exemplary, illustrative non-limiting system for creating and retrieving verifiable media, according to some embodiments of the present invention. As shown in FIG. 1A, a system 100 features a device 110 which is capable of recording media. Device 110 may optionally be any computing device but is preferably a smartphone or alternatively a video or stills camera. Media may optionally comprise any type of media that the device is able to create or record and save including but not limited to photos, videos, audio recordings, text, graphics or any combination of these.

Device 110 preferably comprises a camera 112 for capturing photos or videos, a microphone 114 for capturing audio recordings or the soundtrack of the captured video, and an input means 116 for entering text or creating graphics or drawings. Input means 116 may optionally comprise any means commonly used including but not limited to a touch screen, keyboard, virtual keyboard, mouse, or pen and tablet.

Device 110 further preferably comprises other sensors 118 including but not limited to a WiFi interface 120, cellphone radio 122, compass 124, gyroscope 126, GPS receiver 128, accelerometer 130, and magnetometer 132. Although some of these components do not specifically function as sensors, for example, the cellphone radio 122 is used for phone communication, the components can all provide metadata for the purposes of media verification as will be described below.

Application or "app" 116 runs on device 110. The installation of app 116 on device 110 is further described with reference to FIG. 2 below. App 116 provides an interface for creating media, adds metadata to assist in verifying media and provides an interface for retrieving verifiable media.

App 116 is connected to central server 150 via network 140. Server 150 includes media collector 152, database 154, and media retrieval server 156. Server 150 and its sub-components may be a single server or may be implemented using distributed or cloud computing systems as known in the art. Central server 150 is provided with appropriate security measures as known in the art to prevent unauthorized access or tampering with data stored in database 154.

Network 140 may be any network using any network technology including but not limited to a local area network, a wide area network, a wireless data network including: a cellular network, a WiMAX network, an EV-DO network, an RTT network, a Flash-OFDM network, an iBurst network, an HSPA network, an EDGE network, a GPRS network, a GPS satellite network, a Wi-Fi network, a UTMS network, an LTE network, and/or any combination of the aforesaid networks, which may optionally be private or public networks. Preferably communication between app 116 and server 150 is encrypted using encrypted communication technology as known in the art. All communication with server 150 includes a unique app ID that is assigned to the app 116 during initial setup as described below with reference to FIG. 2.

Both app 116 and media collector 152 are preferably in communication with external data sources 160 via network 140 or via another network (not shown). External data sources may comprise any number of resources such as websites or information repositories which can provide additional metadata to verify the created media.

In operation, a user of device 110 preferably opens app 116 and chooses what type of media to create. App 116 then makes use of camera 112, microphone 114 and input means 116 to create the chosen media. For example the user may choose to take a photograph using camera 112 and then choose to add some descriptive text using input means 116. Or the user may create a document or sketch using input means 116. Concurrently, app 116 preferably contacts server 150 and is provided with a unique media identification code for the media that is being created.

While the media is created, app 116 preferably generates as much metadata as possible according to at least one parameter obtained from the device 110, the app 116 itself, the media or a combination of these. This metadata optionally includes but is not limited to:

The time and date as provided by the device, optionally including the start time of media creation as well as the end time;

Device data from such as manufacturer, model type, MAC address, phone number, operating system and version, IMEI number, and serial number from device memory or processors (not shown);

Detected, WiFi networks and signal strengths from the WiFi interface 120;

Cellphone data such as operator ID, mobile data type and signal strength from cellphone radio 122;

Direction, heading and orientation of the device from the compass 124, accelerometer 130 or magnetometer 132;

Geographic coordinates, height above sea level of the device, and the time and date from the GPS receiver 128; and Calculations made by the device based on other metadata, for example, the position of the sun based on the geographic coordinates and the time of day.

Optionally the app 116 may add a photograph from an additional camera on the device if there is one. For example, if the rear-facing camera was used to capture media, then the front-facing camera will be used to add some photographic metadata. Optionally, the user of app 116 may configure whether to allow or disallow this or other metadata but preferably a basic set of metadata should always be added to the media.

App 116 then combines the media with the metadata, preferably including the unique media identifier received from server 150, to create a file that is then saved on device 110. The structure of the file is further described below with reference to FIG. 1C. The created file is preferably encrypted using tools as known in the art. As described above, the file format is unique and the file cannot be opened with other apps or tools.

The file is then transferred by app 116 to media collector 152 via network 140. Media collector 152 preferably notifies app 116 of successful receipt of the file. App 116 will optionally continue attempts to send the file if it not received or if the server is unavailable. Optionally app 116 continues to gather metadata and continually appends this metadata until the transfer of the file is successful. This ensures tracking of the media from the moment it is created until it is within the secure confines of server 150. Once the receipt of the media is confirmed, the local copy of the media is deleted. Alternatively, the local copy is not deleted.

Collector 152 can read the contents of the received file but cannot make any changes. Collector 152 preferably appends further metadata to the received file including:

Calculations made by collector 152 based on other metadata to supplement calculations already made by app 116, for example, the position of the sun based on the geographic coordinates and the time of day;

The server time and date of reception of the media from the app 116 which is synchronized to an external clock that is part of external data sources 160; and Other data from external data sources 160 such as weather data of the geographic location reported in the received file.

Optionally, app 116 may also add metadata directly obtained from external data sources 160 before saving and transmitting the file to server 150.

Optionally, collector 152 only appends the receive time and date and does not append any other information. The received file with appended data is preferably saved, in the unique encrypted file format described with reference to FIG. 1C, in database 154 as verifiable media. Verifiable media is referenced by the unique ID assigned by the server 150. App 116 saves the unique ID as a reference to the saved verifiable media on device 110 for future retrieval if required.

Reference is now made to FIG. 1B which shows an exemplary, illustrative non-limiting system for retrieving verifiable media, according to some embodiments of the present invention. FIG. 1B illustrates four methods for retrieval of the verifiable media from server 150.

In a first retrieval method the device 110 on which the media was created, is used to retrieve the verifiable media. A user opens app 116 preferably using the credentials provided during the installation of app 116 and chooses the media to view from a list of created media. App 116 requests retrieval of the media based on the unique ID of the media provided during creation. The request is sent via network 140 which is the same network 140 as described above or may be a different network (not shown) to media retrieval server 156. Optionally, the media that is stored on the phone is retrieved without connecting to the server 156.

Retrieval server 156 retrieves the verifiable media from database 154 and transmits it, preferably using encrypted communication, to app 116. App 116 then displays the verifiable media on the screen 170 of device 110. The display of the media may be similar to that shown in FIG. 6 as described below.

In a second retrieval method, a user is provided with a unique link, an HTTPS URL, to verifiable media. The unique link is provided as described below with reference to FIGS. 4 and 5. Alternatively, the user of device 110 accesses the website of retrieval server 156 and provides the same login credentials used for app 116. The user will then be able to choose from a list of verifiable media that they have created. Optionally, the user is presented with thumbnail images to choose from. Optionally, access to the website of retrieval server 156 is provided from within app 116.

The user accesses the media on device 172 using a thin client 174 such as a web browser optionally with a reader plugin that allows viewing of the verifiable media. The thin client 174 requests the verifiable media from server 156 via network 140. The media is retrieved from database 154 as described above. The media is provided for viewing from server 156, which includes web server functionality (not shown), via the thin client 174 on screen 176. The display of the media may be similar to that shown in FIG. 6 as described below.

In a third retrieval method, a user installs a media reader 180 on device 178. Media reader 180 is adapted to read the unique file format describing the verifiable media. The user is provided with a unique link, an HTTPS URL, to verifiable media. The unique link is provided as described below with reference to FIGS. 4 and 5. The user provides the link to media reader 180 which requests the verifiable media from server 156 via network 140. The media is retrieved from database 154 as described above. The media is uploaded to reader 180 via network 140 and is displayed on screen 182. The display of the media may be similar to that shown in FIG. 6 as described below.

In a fourth retrieval method, a printout of the verifiable media is requested by app 116, thin client 174, or media reader 180. The request is made to retrieval server 156 which prints a certificate describing verifiable media on printer 190. The printout of the media may be similar to that shown in FIG. 6 as described below. The certificate is then mailed to an address as defined in the printing request.

Figure 1C:
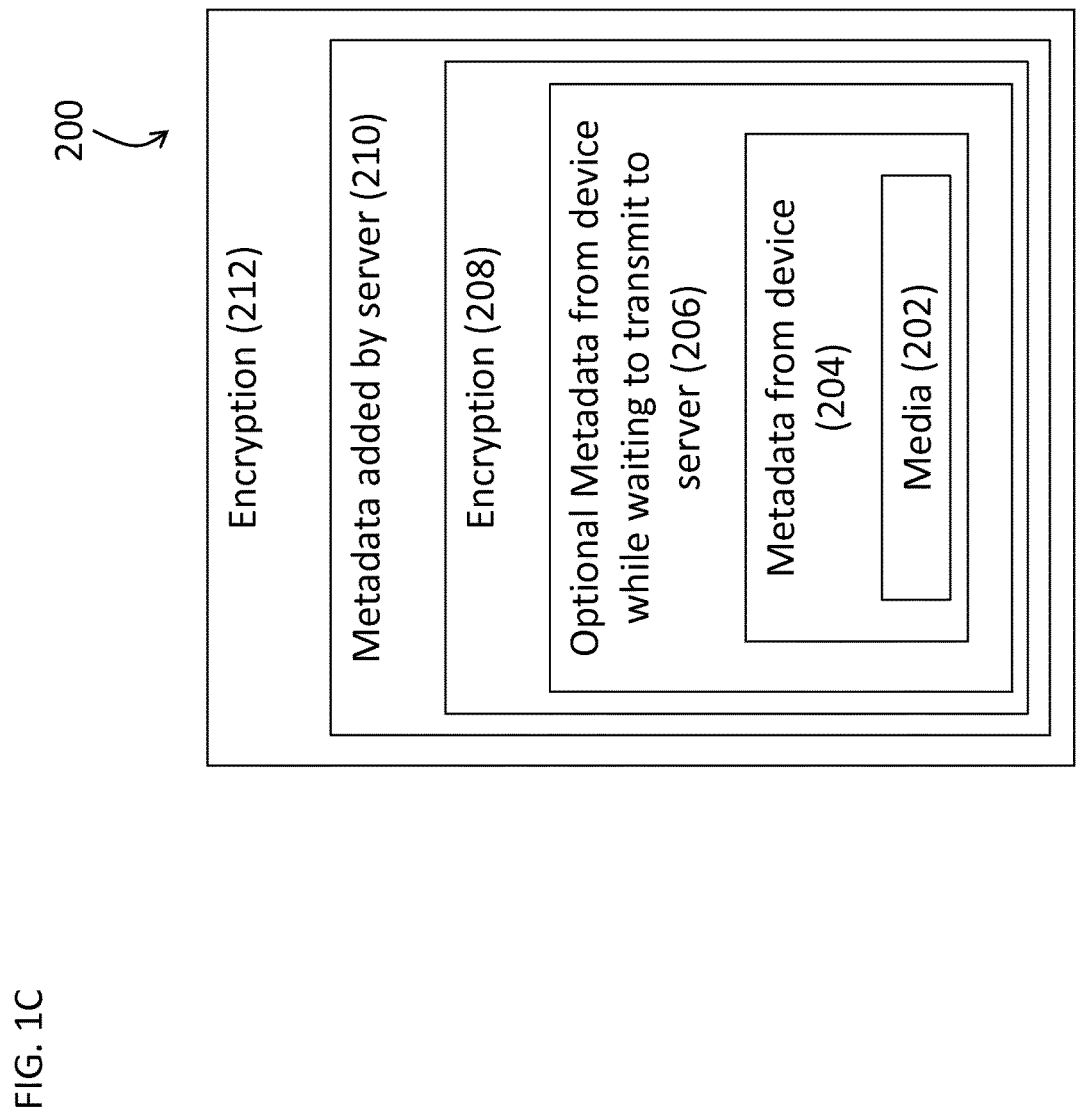
FIG. 1C is an exemplary illustration of the file structure of verifiable media, according to some embodiments of the present invention.

Reference is now made to FIG. 1C which is an exemplary illustration of the file structure of verifiable media, according to some embodiments of the present invention. As described above, the file structure is unique and can only be read by dedicated software readers or interpreted by a central server for display via a webpage. The file is an example of a verifiable media package. The file 200 is composed of a series of layers that are sequentially added as described above. The media 202 is recorded and then metadata 204 such as from sensors 118 is added. Optionally, further metadata 206 is added while app 116 waits to upload the file to server 150 in cases where the server is not immediately available. The combined media and metadata are encrypted using encryption schemes with an encryption layer 208 as known in the art.

The file comprising media 202, metadata 204, optional metadata 206, and encryption 208 is uploaded by app 116 to server 150. This uploaded file is already considered to be verifiable media but is preferably further enhanced on the server with the addition of further metadata. Further metadata 210 such as that from external data sources 160 is added by server 150. The file is preferably further encrypted including a further encryption layer 212 to form the completed enhanced verifiable media file 200 (also referred to interchangeably herein as simply verifiable media) which is stored in database 154 for retrieval.

Optionally, the time of receipt of the uploaded file is recorded and the uploaded file is stored without the addition of further metadata or encryption.

Figure 2:
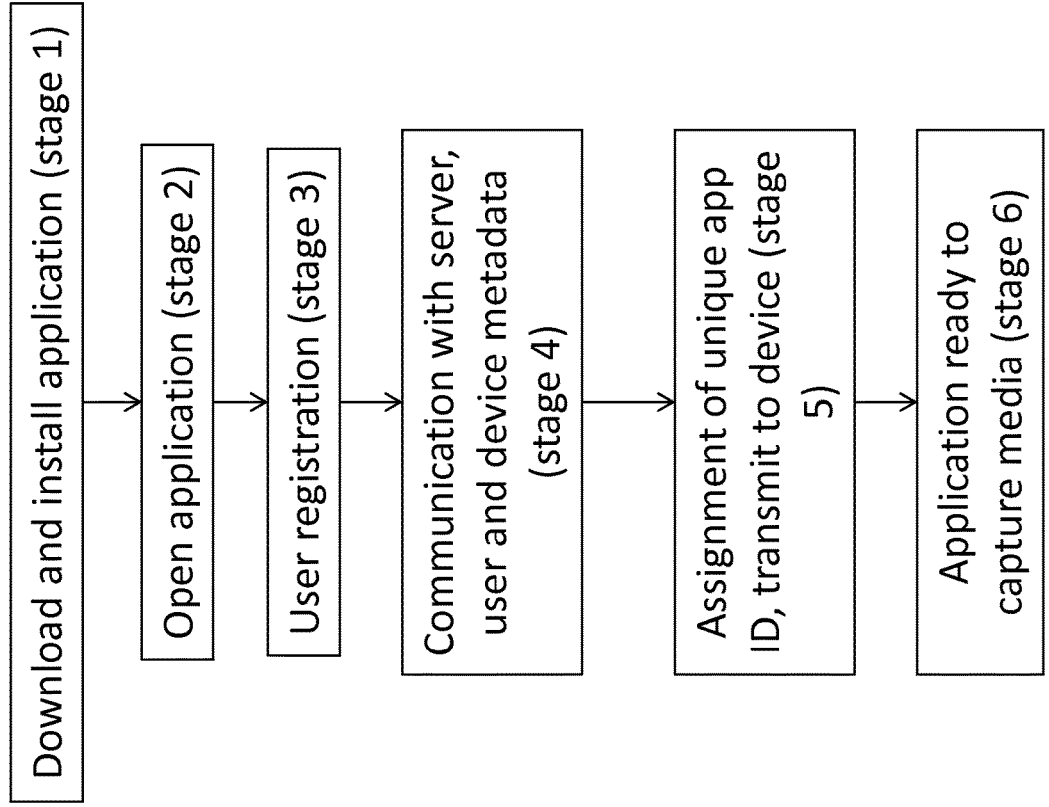
FIG. 2 is a flowchart of an exemplary, illustrative method for installation of an application for creating and retrieving verifiable media according to at least some embodiments of the present invention.

Reference is now made to FIG. 2 which is a flowchart of an exemplary, illustrative method for installation of an application for creating and retrieving verifiable media according to at least some embodiments of the present invention. In stage 1 the user downloads and installs the app. This may be via a recognized app store such as Apple's iTunes App Store or the Google Play store. Alternatively, the app may be downloaded in and installed from another online service for any applicable operating system. Once the app is installed the user opens the app in stage 2.

In stage 3 the user provides registration details to the app such as a name, email address, and preferred password. These credentials are transmitted to a central server in stage 4 along with device metadata obtained by the app. This metadata preferably includes device information such as manufacturer, model type, MAC address, phone number, operating system and version, IMEI number, and serial number.

In stage 5 the server assigns a unique app ID to the app and transmits the ID to the app. This ID is included in all further communication between the app and the central server and serves as an authentication means. Once the app has received the app ID it is now ready to create media in stage 6. Optionally, stage 5 is skipped.

Figure 3A:
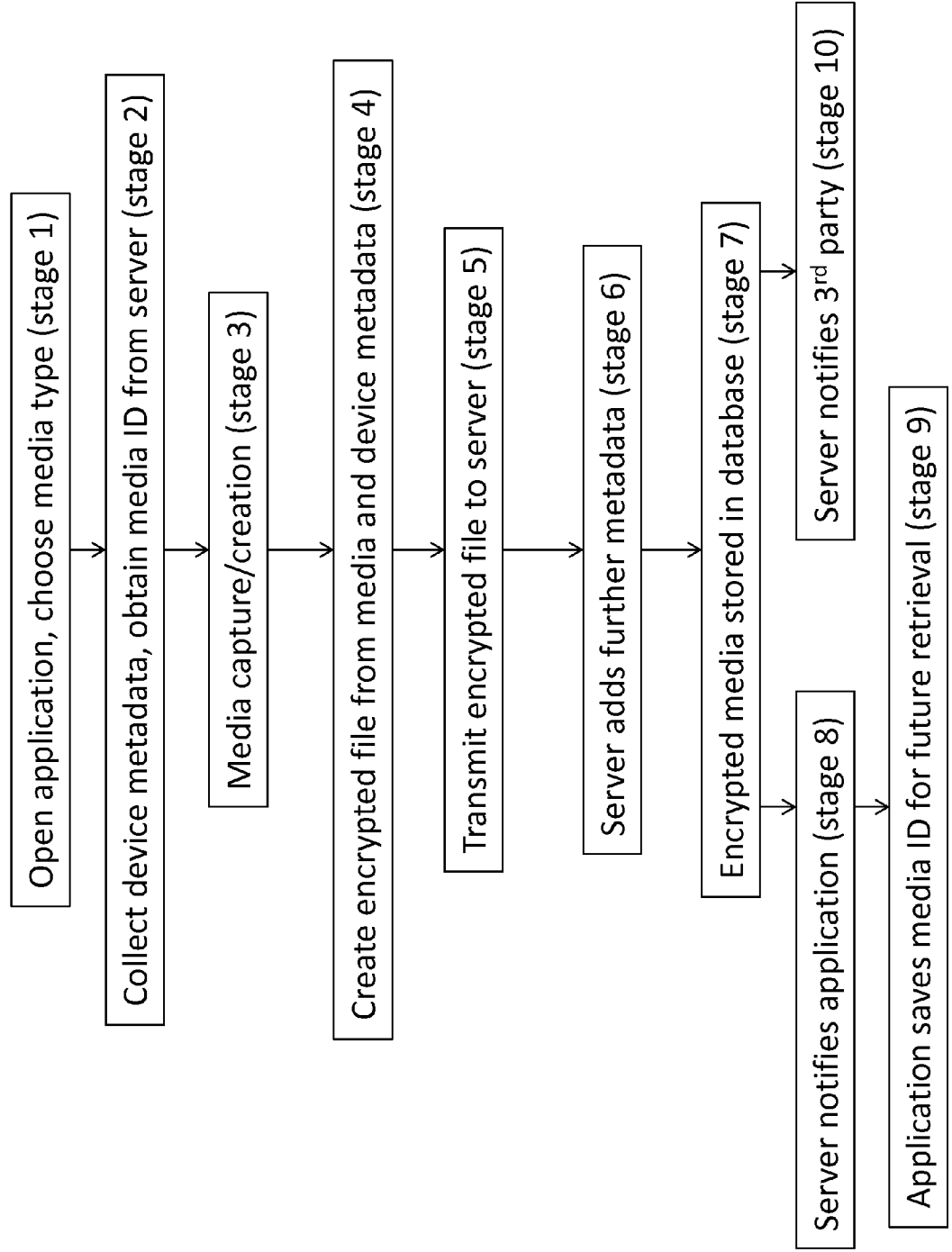
FIG. 3A is a flowchart of an exemplary, illustrative method for creating verifiable media according to at least some embodiments of the present invention.
Figure 3B:
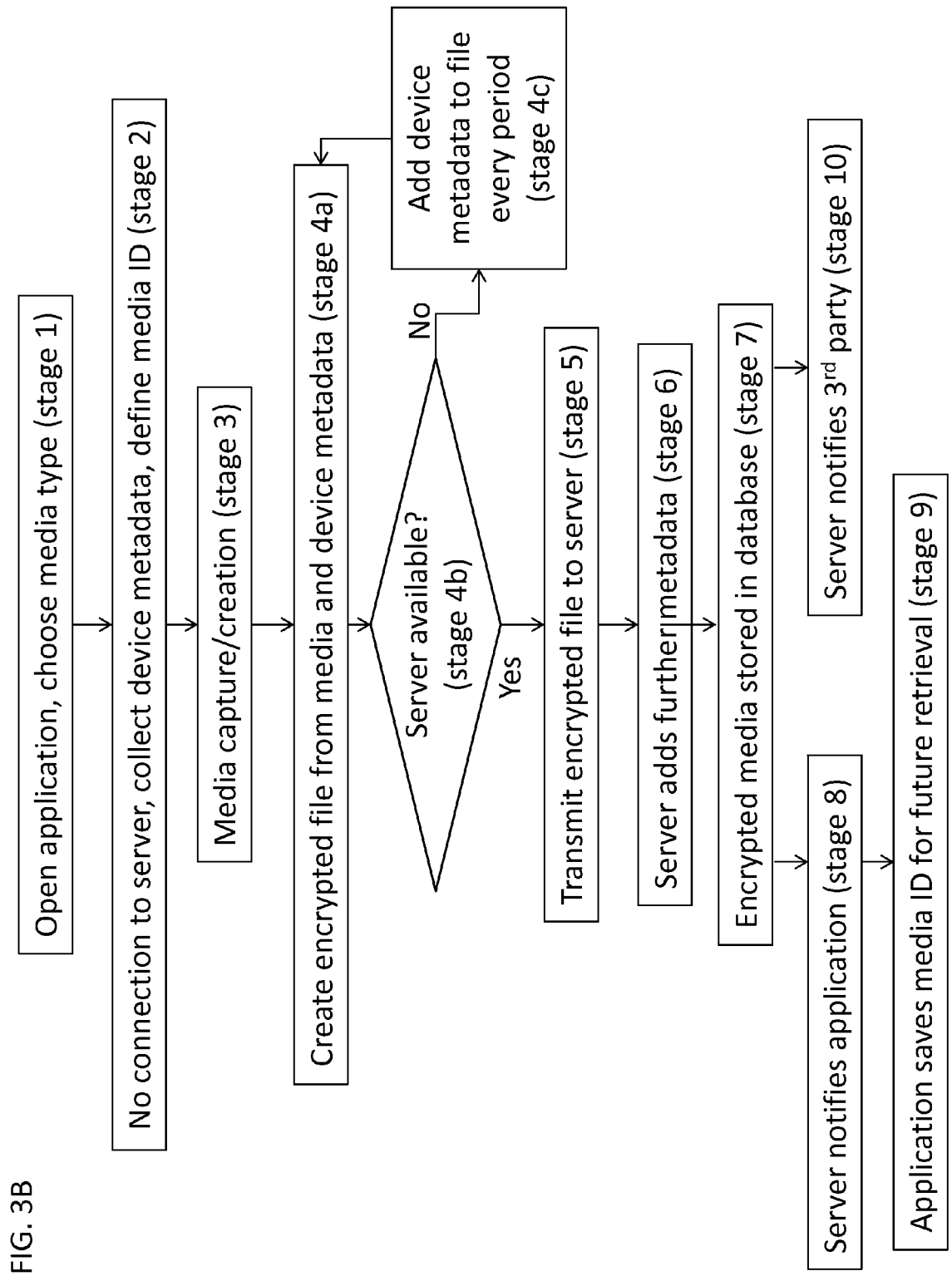
FIG. 3B is a flowchart of an exemplary, illustrative method for creating verifiable media when the creating device is offline according to at least some embodiments of the present invention.

Reference is now made to FIGS. 3A and 3B which are flowcharts of an exemplary, illustrative method for creating verifiable media according to at least some embodiments of the present invention. In stage 1 the user opens the app to capture or create verifiable media and chooses the type of media to be created such as a video, photo, audio recording or sketch. In stage 2 the app preferably contacts the central server, indicates that new media is being created and requests a unique media ID. The app provides device metadata such as the metadata collected from the various sensors described with reference to FIG. 1. The server then allocates a unique media identification code for the media that is being created. Optionally, stage 2 is skipped.

In stage 3 the media is captured or created using the camera, microphone and input means as described with reference to FIG. 1. In stage 4 the app combines the media with the metadata, preferably including the unique media identifier received from server to create a file that is then saved on device with encryption as known in the art. As described above, the file format is unique and the created verifiable media file cannot be opened with other apps or tools.

The file is then transferred by the app to the central server in stage 5 preferably via an encrypted network connection. Once the receipt of the media by the server is confirmed, the local copy of the media is deleted. Optionally, the local copy is not deleted.

In stage 6, the server preferably appends further metadata to the received file such as the metadata described with reference to FIG. 1 above. Optionally, stage 6 is skipped. In stage 7 the encrypted media is saved in the database of central server as enhanced verifiable media. In stage 8 the server notifies the app of the successful storage. In stage 9 the app saves the unique verifiable media ID for future retrieval of the verifiable media. In optional stage 10 the server notifies a $3^{rd}$ party that new media has been created by the user and sends a link to the media. This stage might be useful for example in a news agency that wishes to receive new verifiable media as it is created. Retrieval of the media is further described with reference to FIG. 4 and FIG. 5.

FIG. 3B depicts the verifiable media creation process as in FIG. 3A, but includes further stages defining behavior of the app in case there is no connection to the central server. In stage 1 the user opens the app to capture or create verifiable media and chooses the type of media to be created such as a video, photo, audio recording or sketch. In stage 2 the app attempts to contact the central server but fails. The app begins collection of device metadata and defines a unique media identification code for the media that is being created. The device metadata is collected from the various sensors described with reference to FIG. 1. The app cannot wait for the server to be available at this stage since the creation of media may be urgent.

In stage 3 the media is captured or created using the camera, microphone and input means as described with reference to FIG. 1. In stage 4a the app combines the media with the metadata, preferably including the unique media identifier to create a file that is then saved on device with encryption as known in the art. As described above, the file format is unique and the file cannot be opened with other apps or tools.

In stage 4b the app determines whether the central server is still unavailable. If it is then, in stage 4c, further device metadata is added to the file. The encrypted file is recreated in stage 4a with the new metadata appended to the existing metadata. The server availability check is performed on a periodic basis, optionally every few seconds or minutes. This process results in a complete history of the file from the start of its creation until successful transmission to the server. For example, metadata such as the geographic coordinates may have changed with each successive cycle of stage 4c providing a trace of the device and file.

Once the server is found to be available in stage 4b, the file is transferred by the app to the central server in stage 5 preferably via an encrypted network connection. Once the receipt of the media by the server is confirmed, the local copy of the media is deleted. Optionally, the local copy is not deleted. Stages 6 to 9 then proceed as described above with reference to FIG. 3A. Optional stage 10 may also be applicable, providing a link to the media to a $3^{rd}$ party as described above.

Figure 4:
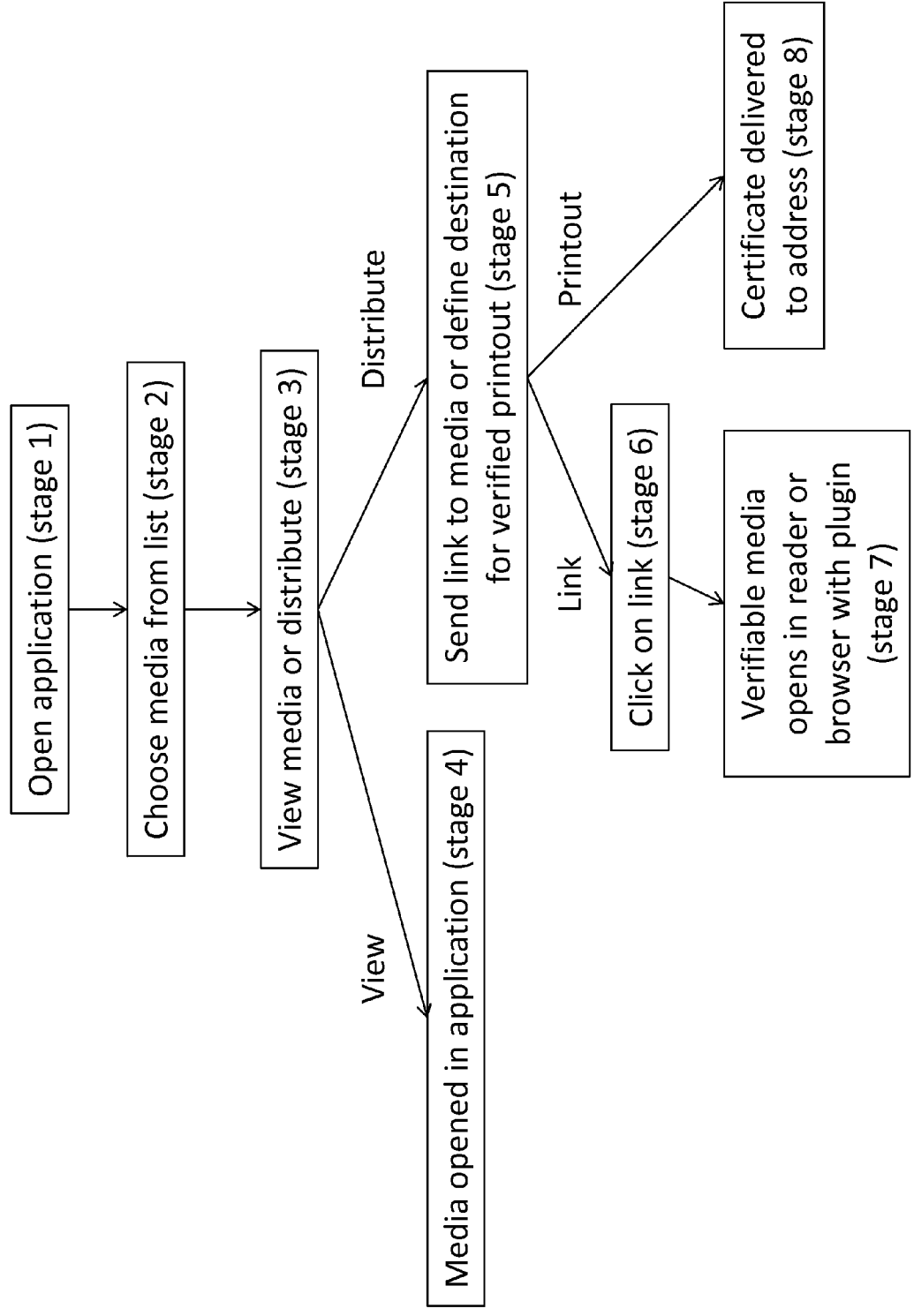
FIG. 4 is a flowchart of an exemplary, illustrative method for retrieving verifiable media from the device that created the media according to at least some embodiments of the present invention.

Reference is now made to FIG. 4 which is a flowchart of an exemplary, illustrative method for retrieving verifiable media from the device that created the media according to at least some embodiments of the present invention. In stage 1 a user opens the app preferably using the credentials provided during the installation and chooses the media to view from a list of created media in stage 2. In stage 3 the user chooses whether to view the verifiable media or to distribute it to another user or device.

In stage 4 the user chooses to view the verifiable media within the app which requests retrieval of the media based on the unique ID of the media provided during creation. The request is sent to the server which retrieves the verifiable media from its database and transmits it, preferably using encrypted communication, to the app. The app then displays the verifiable media.

In stage 5 the user chooses to distribute the verifiable media and the user is given a further choice of sending a unique HTTPS link or ordering a printout. If the link option is chosen, the link may be sent via email or any other messaging protocol. In stage 6 the recipient of the link clicks on the link and in stage 7 the verifiable media is viewed using a thin client such as a web browser optionally with a reader plugin that allows viewing of the verifiable media. Alternatively the verifiable media is opened by a media reader such as the reader described above with reference to FIG. 1B.

Alternatively, in stage 5, the user chooses to order a printout of the verifiable media. The user defines the physical address for receiving the printout and in stage 8 the certificate describing the verifiable media is delivered to the defined address.

Figure 5:
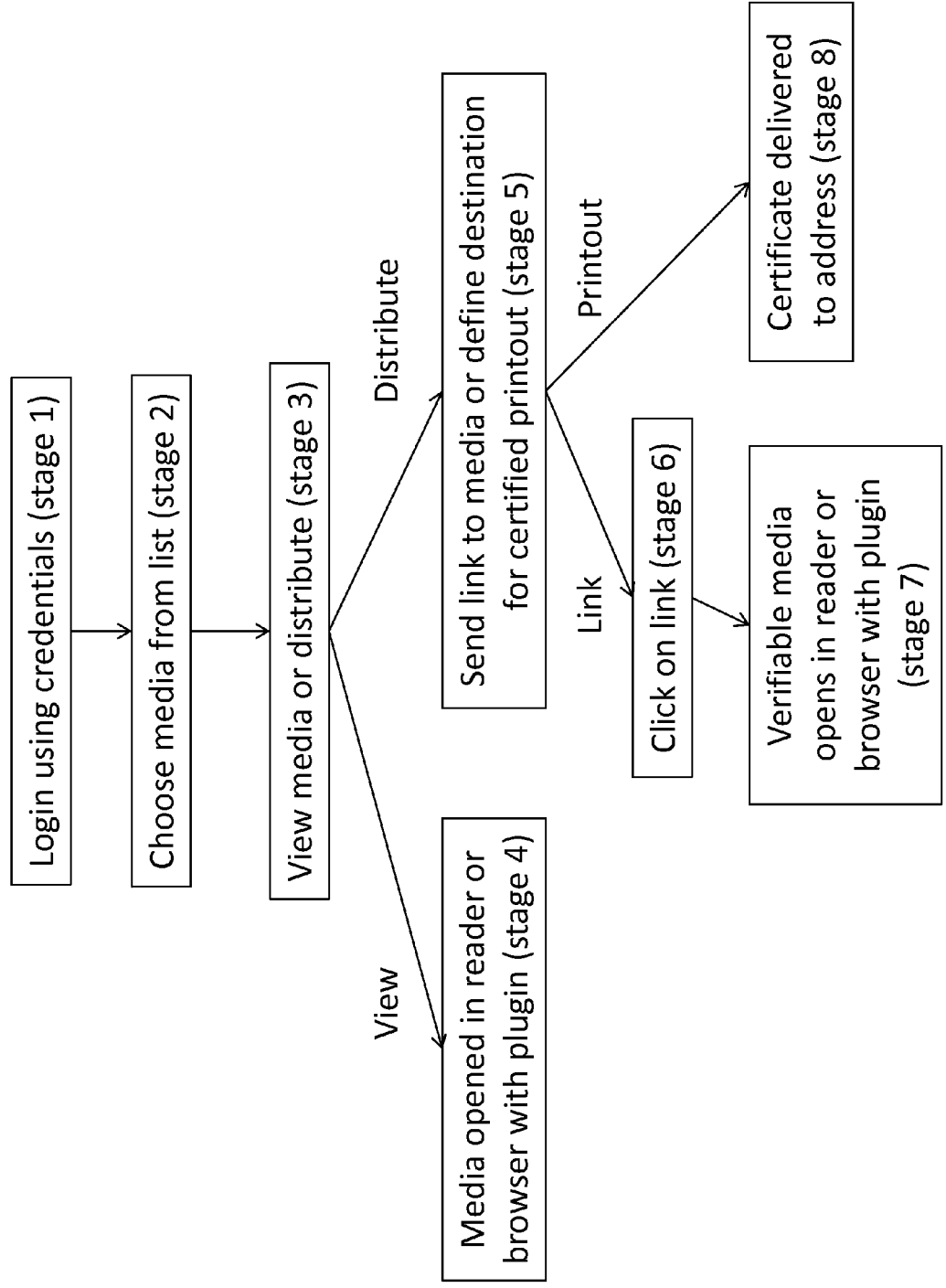
FIG. 5 is a flowchart of an exemplary, illustrative method for retrieving verifiable media from the website of the verifying entity according to at least some embodiments of the present invention.

Reference is now made to FIG. 5 which is a flowchart of an exemplary, illustrative method for retrieving verifiable media from the website of the verifying entity according to at least some embodiments of the present invention. In stage 1 the user accesses the website associated with the central server using a web browser and logs in using the credentials provided when the app was installed as described with reference to FIG. 2 above. Once logged in the user is presented with a list of media that they have created. In stage 2 the user chooses the media that they wish to access. In stage 3 the user chooses whether to view the verifiable media or to distribute it to another user or device.

In stage 4 the user chooses to view the verifiable media. The central server then retrieves the verifiable media for display via the web server associated with central server. The verifiable media is then opened using the web browser optionally with a reader plugin or alternatively the browser launches a media reader that allows viewing of the verifiable media. Alternatively, the file is downloaded and then opened with a media reader that allows viewing of the verifiable media.

In stage 5 the user chooses to distribute the verifiable media and the user is given a further choice of sending a unique HTTPS link or ordering a printout. If the link option is chosen, the link may be sent via email or any other messaging protocol. In stage 6 the recipient of the link clicks on the link and in stage 7 the verifiable media is viewed using a thin client such as a web browser optionally with a reader plugin that allows viewing of the verifiable media. Alternatively the verifiable media is opened by a media reader such as the reader described above with reference to FIG. 1B.

Alternatively, in stage 5, the user chooses to order a printout of the verifiable media. The user defines the physical address for receiving the printout and in stage 8 the certificate describing the verifiable media is delivered to the defined address.

Figure 6:
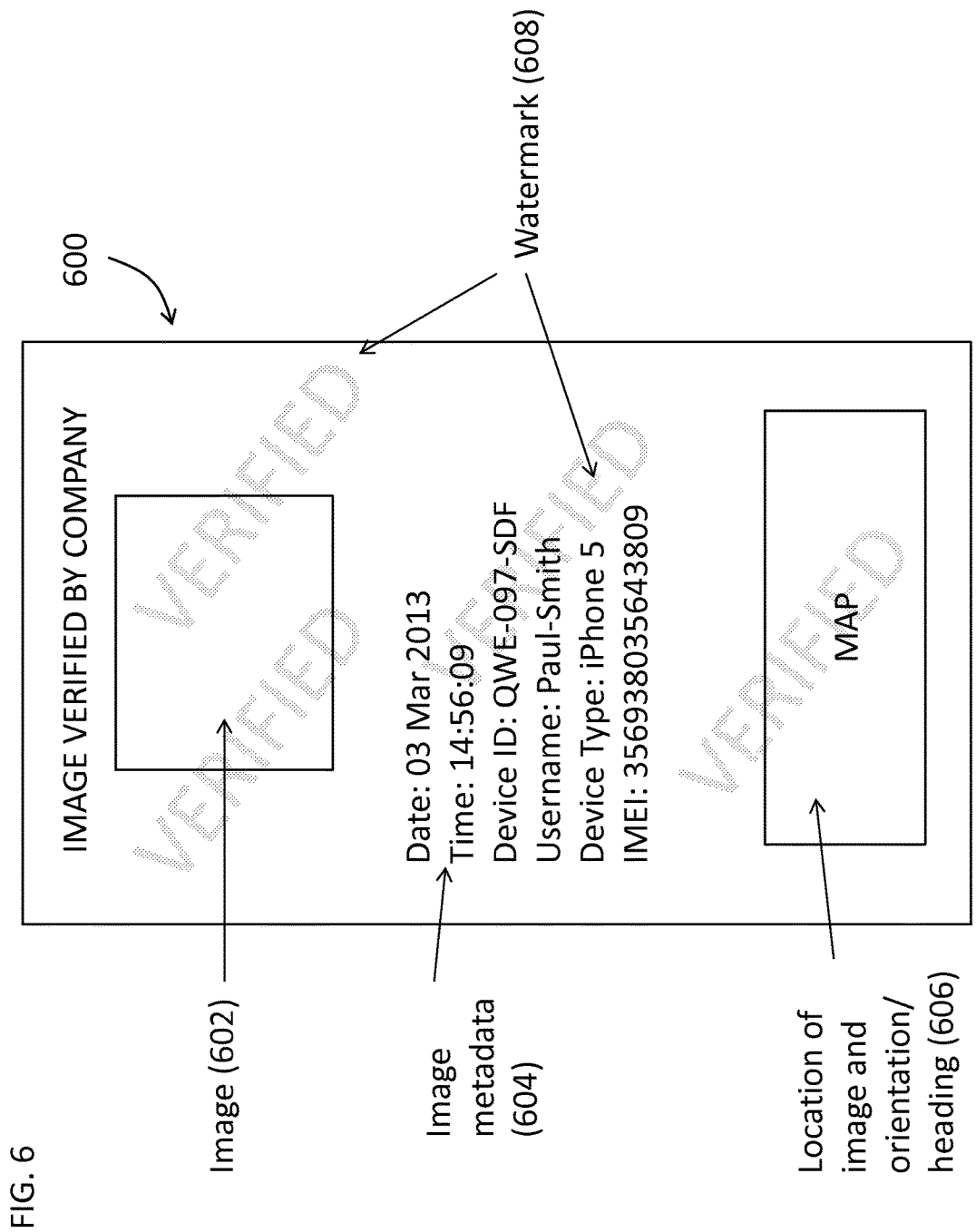
FIG. 6 is an exemplary illustration of a certificate containing verifiable media according to at least some embodiments of the present invention.

Reference is now made to FIG. 6 which is an exemplary illustration of a certificate containing verifiable media according to at least some embodiments of the present invention. Certificate 600 is the printed verifiable media described with reference to FIGS. 4 and 5 above. Alternatively, the layout depicted for certificate 600 could be used in the display of verifiable media via the app, web browser or media viewer as described above.

Certificate 600 includes the image 602 or a visualization of other media represented in an appropriate manner. For example, a video clip could be represented by a series of identifiable frames. Certificate 600 also preferably includes a list of metadata 604 that was generated as described above. Geographic location metadata is optionally presented in the form of a map 606 showing the location of the creation of the media as well as the orientation or heading based on sensor data.

Certificate 600 also includes a watermark 608, hologram (not shown), or other anti-counterfeiting means to prevent simple copying or forgery. Optionally, the entity providing the verifiable media app can include a company logo which is similarly printed with anti-forgery techniques.

While the invention has been described with respect to a limited number of embodiments, it will be appreciated that many variations, modifications and other applications of the invention may be made.

What is claimed is:

1. A method for generating a verifiable media package, the method comprising:
    a) providing a computational device for generating media;
    b) providing software for operation by said device;
    c) generating media using said device and said software;
    d) generating metadata according to at least one parameter obtained from at least one of said device, said software, said media or a combination thereof;
    e) combining said media, and said metadata into an encrypted package;
    f) transmitting said encrypted package to a central server, wherein said transmitting of said encrypted package takes place over an encrypted network connection between said software and said server;

g) generating further metadata according to at least one parameter obtained from at least one of said server or an external resource or a combination thereof;

h) combining said further metadata and said encrypted package into a further encrypted package thereby creating said verifiable media package;

i) providing a computational device operating a web browser;

j) providing a dedicated software plugin from said server to said browser to allow said browser to view the verifiable media package;

k) sending by said server of a unique link to said verifiable media package for opening by said browser;

l) requesting to view said verifiable media package at said link by said web browser operating said plugin from said server;

m) transmitting said media package to said web browser by said server; and n) viewing said package with said browser operating said plugin.

2. The method of claim 1 further comprising:
a) requesting to view said verifiable media package by said software from said server;
b) transmitting said media package to said software by said server; and
c) viewing said package with said software.

3. The method of claim 2 further comprising:
a) requesting a printed document describing said verifiable media by said software or a web browser or verifiable media viewing software from said server; and
b) printing said document by said server wherein said document comprises a visualization of said generated media, said metadata, and said further metadata.

4. The method of claim 3 wherein said document further comprises at least one of a hologram, a watermark or both.

5. The method of claim 1 further comprising:
a) providing a computational device operating verifiable media viewing software capable of viewing a verifiable media package;
b) requesting to view said verifiable media package by said viewing software from said server;
c) transmitting said media package to said viewing software by said server; and
d) viewing said package with said viewing software.

6. The method of claim 1 wherein said device comprises at least one of a still image camera, video camera, and microphone and wherein said generated media comprises at least one of a photo captured by said still image camera, a video captured by said video camera and said microphone, an audio recording captured by said microphone, or any combination of these.

7. The method of claim 6 wherein said still image camera and said video camera are contained within a single camera device.

8. The method of claim 7 wherein said device comprises at least one of a touch screen, a keyboard, a virtual keyboard, a mouse, and a pen and tablet and wherein said generated media comprises at least one of text or graphics created using at least one of said touch screen, said keyboard, said virtual keyboard, said mouse, said pen and tablet or any combination of these.

9. The method of claim 1 wherein said device comprises at least one component selected from the group consisting of a WiFi interface, cellphone radio, compass, gyroscope, GPS receiver, accelerometer, and magnetometer, and wherein said metadata is generated according to at least one parameter obtained from said at least one component.

10. The method of claim 9 wherein said metadata comprises at least one of: the name and signal strength of a WiFi network detected by said WiFi interface; cellphone operator ID, mobile data type and signal strength detected by said cellphone radio; direction, heading and orientation of said device indicated by said compass, said accelerometer or said magnetometer; geographic coordinates of said device, and height above sea level of said device provided by said GPS receiver or any combination of these.

11. The method of claim 10 wherein said metadata comprises the time and date of the generation of said media as provided by one of said device or said GPS receiver or both of these.

12. The method of claim 1 wherein said metadata comprises at least one of the device manufacturer, model type, MAC address, phone number, operating system and version, IMEI number, serial number or a combination of these obtained from said device.

13. A system for generating a verifiable media package comprising:
a) a computational device for generating media;
b) software for operation on said device;
c) a central server for storing said package;
d) an encrypted network connection between said software and said server; and
e) a computational device operating a web browser with dedicated plugin to allow said browser to view the verifiable media package, wherein said plugin is provided from said server to said device;
wherein said media is generated by said device and said software, said media is combined with metadata and then encrypted to form an encrypted package by said software, said encrypted package is transferred to said server by said software, generating further metadata by said server, combining said further metadata and said encrypted package into a further encrypted package thereby creating said verifiable media package, wherein said metadata is generated according to at least one parameter obtained from said device, said software, said media or a combination thereof, and said further metadata is generated according to at least one parameter obtained from at least one of said server or an external resource or a combination thereof; wherein said software or said server sends a unique link to said verifiable media package for opening by said browser; wherein said browser requests to view said verifiable media package at said link; wherein said server transmits said verifiable media package, and said package is viewed by said browser operating said plugin.

14. The system of claim 13 wherein said server further comprises a retrieval server operative to transmit said verifiable media package to said software upon request from said software for viewing by said software.

15. The system of claim 14 further comprising a computational device operating verifiable media viewing software operative to request said verifiable media package from said retrieval server and to allow viewing of said verifiable media package when said retrieval server transmits said verifiable media package to said viewing software.

16. The system of claim 13 wherein said device comprises at least one of a still images camera, video camera, and microphone and wherein said generated media is at least one of a photo captured by said stills camera, a video captured by said video camera and said microphone, an audio recording captured by said microphone, or any combination of these.

17. The system of claim 16 wherein said still images camera and said video camera are contained within a single camera device.

18. The system of claim 16 wherein said device comprises at least one of a touch screen, a keyboard, a virtual keyboard, a mouse, and a pen and tablet and wherein said generated media comprises at least one of text or graphics created using at least one of said touch screen, said keyboard, said virtual keyboard, said mouse, said a pen and tablet or any combination of these.

19. The system of claim 13 wherein said device comprises at least one component selected from the group consisting of a WiFi interface, cellphone radio, compass, gyroscope, GPS receiver, accelerometer, and magnetometer and wherein said metadata is generated according to at least one parameter obtained from said at least one component.

20. The system of claim 19 wherein said metadata comprises at least one of: the name and signal strength of a WiFi network detected by said WiFi interface; cellphone operator ID, mobile data type and signal strength detected by said cellphone radio; direction, heading and orientation of said device indicated by said compass, said accelerometer or said magnetometer; geographic coordinates of said device, and height above sea level of said device provided by said GPS receiver or any combination of these.

21. The system of claim 19 wherein said metadata comprises the time and date of the generation of said media as provided by one of said device or said GPS receiver or both of these.

22. The system of claim 13 wherein said metadata comprises at least one of the device manufacturer, model type, MAC address, phone number, operating system and version, IMEI number, serial number or a combination of these obtained from said device.

* * * * *